(12) United States Patent
Smith

(10) Patent No.: US 11,849,666 B2
(45) Date of Patent: Dec. 26, 2023

(54) MOWER BLADE BRACKET APPARATUS

(71) Applicant: David Smith, Staunton, IL (US)

(72) Inventor: David Smith, Staunton, IL (US)

(*) Notice: Subject to any disclaimer, the term of this patent is extended or adjusted under 35 U.S.C. 154(b) by 664 days.

(21) Appl. No.: 17/032,131

(22) Filed: Sep. 25, 2020

(65) Prior Publication Data
US 2022/0095533 A1  Mar. 31, 2022

(51) Int. Cl.
*A01D 34/00* (2006.01)
*A01D 101/00* (2006.01)
*A01D 34/73* (2006.01)

(52) U.S. Cl.
CPC .......... *A01D 34/001* (2013.01); *A01D 34/733* (2013.01); *A01D 2101/00* (2013.01)

(58) Field of Classification Search
CPC . A01D 34/001; A01D 34/733; A01D 2101/00
USPC ....................................................... 269/309
See application file for complete search history.

(56) References Cited

U.S. PATENT DOCUMENTS

| | | | |
|---|---|---|---|
| 893,302 A * | 7/1908 | Blanch et al. | B24B 3/42 451/421 |
| 4,564,991 A | 1/1986 | Taylor | |
| 4,736,544 A * | 4/1988 | Greenquist | B24B 3/365 451/380 |
| 4,882,960 A | 11/1989 | Kugler | |
| 4,956,905 A | 9/1990 | Davidson | |
| 6,715,194 B1 | 4/2004 | Sterling | |
| 8,209,837 B1 | 7/2012 | Henshaw | |
| 2003/0070408 A1* | 4/2003 | Keane | A01D 43/16 56/16.9 |
| 2020/0316761 A1* | 10/2020 | Hoyt | A01D 34/828 |

* cited by examiner

*Primary Examiner* — Mahmoud Gimie

(57) ABSTRACT

A mower blade bracket apparatus for safely changing mower blades includes a bracket body comprising a first half adjustably coupled to a second half to adjust for a distance between a first distal end and a second distal end. The first distal end and the second distal end have a first mounting aperture and a second mounting aperture extending therethrough, respectively. A pair of mounting bolts is coupled to the bracket body. The pair of mounting bolts is engaged with the first mounting aperture and the second mounting aperture to selectively engage a skirt of a lawn mower. A blade sleeve is coupled to the bracket body. The blade sleeve slidingly receives a blade of the lawn mower.

6 Claims, 5 Drawing Sheets

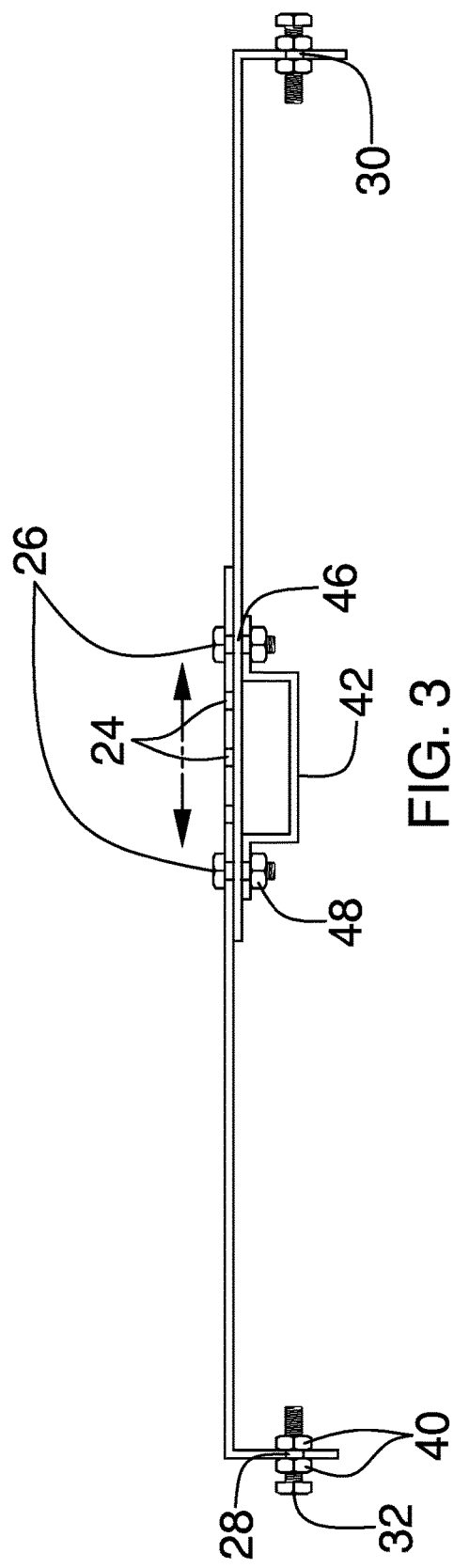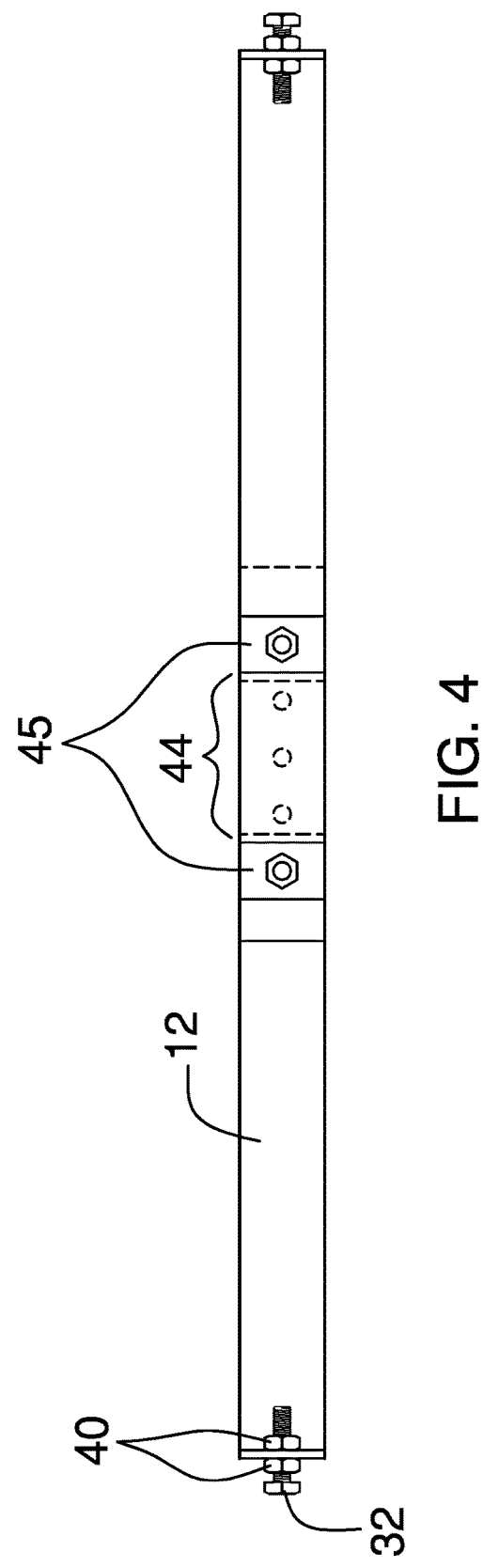

MOWER BLADE BRACKET APPARATUS

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to mower service devices and more particularly pertains to a new mower service device for safely changing mower blades.

(2) Description of Related Art Including Information Disclosed Under 37 CFR 1.97 and 1.98

The prior art relates to mower service devices. Existing devices include hand tools and clamps to secure the mower blade in place while allowing the user to remove the nut. Many such devices still require one of the user's hands and thus hinder ease of use. Those that do allow for hands free operation do not span the width of the mower and require adjustment to secure the blade in place.

BRIEF SUMMARY OF THE INVENTION

An embodiment of the disclosure meets the needs presented above by generally comprising a bracket body comprising a first half adjustably coupled to a second half to adjust for a distance between a first distal end and a second distal end. The first distal end and the second distal end have a first mounting aperture and a second mounting aperture extending therethrough, respectively. A pair of mounting bolts is coupled to the bracket body. The pair of mounting bolts is engaged with the first mounting aperture and the second mounting aperture and configured to selectively engage a skirt of a lawn mower. A blade sleeve is coupled to the bracket body. The blade sleeve is configured to slidingly receive a blade of the lawn mower.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein:

FIG. 3 is a front elevation view of an embodiment of the disclosure.

FIG. 4 is a bottom plan view of an embodiment of the disclosure.

DETAILED DESCRIPTION OF THE INVENTION

Figure 1:
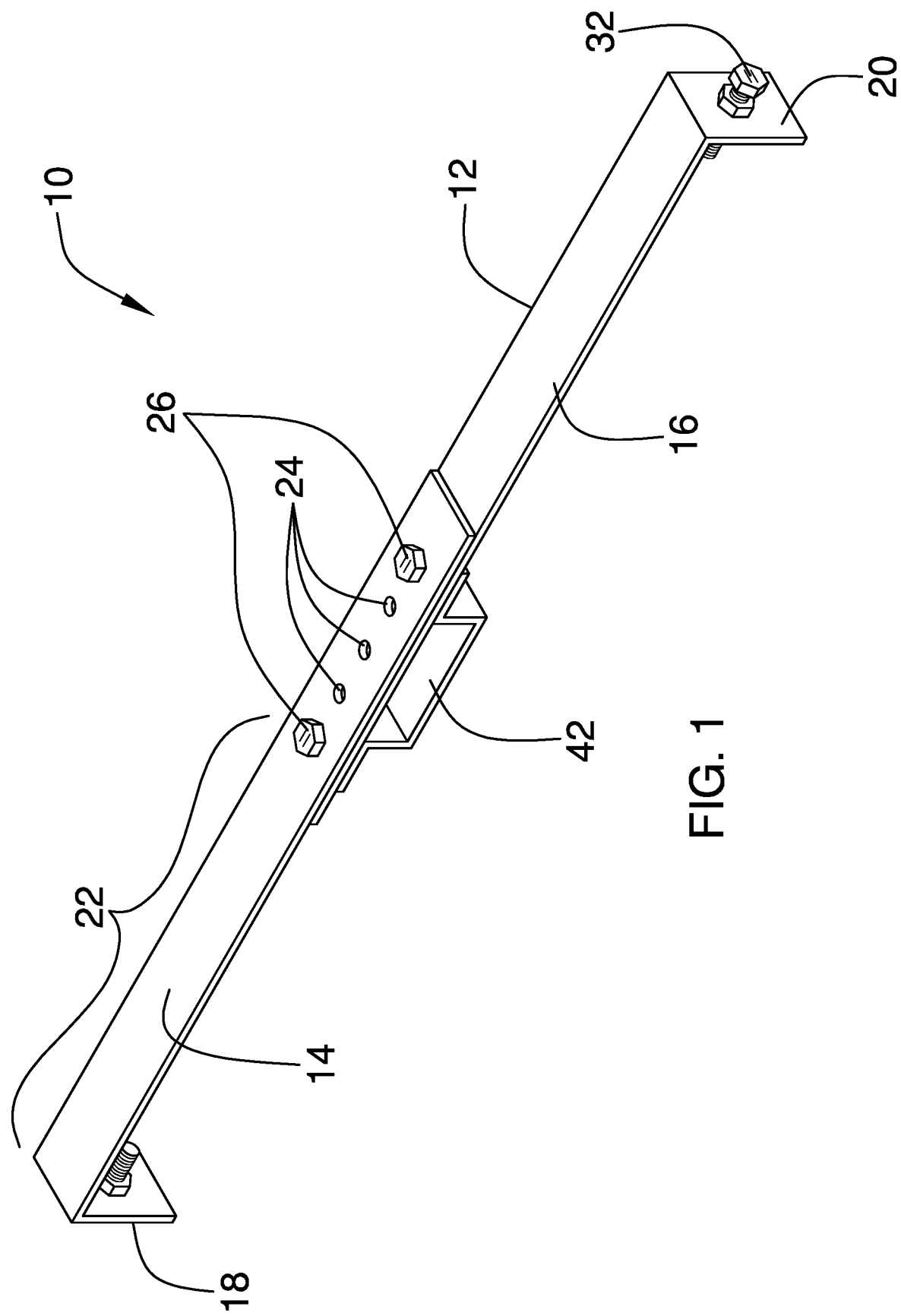
FIG. 1 is an isometric view of a mower blade bracket apparatus according to an embodiment of the disclosure.
Figure 2:
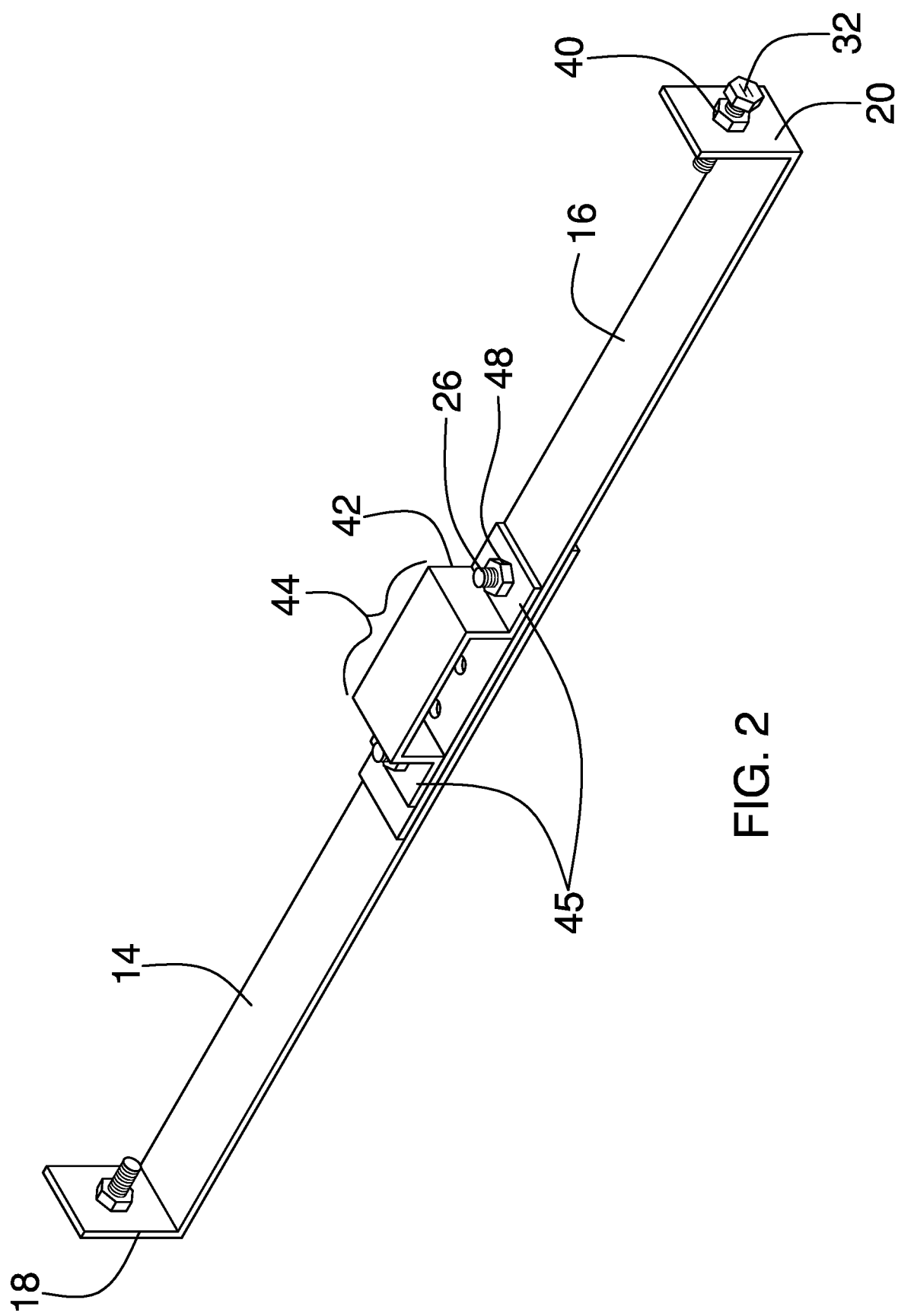
FIG. 2 is an isometric view of an embodiment of the disclosure.

With reference now to the drawings, and in particular to FIGS. 1 through 6 thereof, a new mower service device embodying the principles and concepts of an embodiment of the disclosure and generally designated by the reference numeral 10 will be described.

As best illustrated in FIGS. 1 through 6, the mower blade bracket apparatus 10 generally comprises a bracket body 12 comprising a first half 14 adjustably coupled to a second half 16 to adjust for a distance between a first distal end 18 and a second distal end 20. The first distal end 18 and the second distal end 20 of the bracket body may extend perpendicularly from a main portion 22 of the bracket body.

Each of the first half 14 and the second half 16 of the bracket body has a plurality of adjustment apertures 24 extending therethrough. The plurality of adjustment apertures 24 is selectively alignable to receive a pair of assembly bolts 26.

The first distal end 18 and the second distal end 20 have a first mounting aperture 28 and a second mounting aperture 30 extending therethrough, respectively. A pair of mounting bolts 32 is coupled to the bracket body 12. The pair of mounting bolts 32 is engaged with the first mounting aperture 28 and the second mounting aperture 30 and configured to selectively engage a skirt 34 of a lawn mower 36. On a dual-blade lawn mower 36 the pair of mounting bolts 32 engages the skirt 34 between a pair of blades 38 of the lawn mower. Each of the pair of mounting bolts 32 may have a pair of mounting nuts 40. The pair of mounting nuts 40 is positioned on each side of the bracket body 12 to allow for fine adjustment of the mounting bolt 32.

A blade sleeve 42 is coupled to the bracket body 12. The blade sleeve 42 may have a rectangular U-shaped receiving portion 44 and a pair of lateral flange portions 45. The blade sleeve 42 has a pair of assembly apertures 46 extending through the pair of lateral flange portions 45. The pair of assembly apertures 46 selectively receives the pair of assembly bolts 26 and a pair of assembly nuts 48 is then engaged with the pair of assembly bolts 26 to secure the blade sleeve 42, the first half 14, and the second half 16 in position. The receiving portion 44 is configured to slidingly receive one blade of the pair of blades 38 of the lawn mower.

Figure 5:
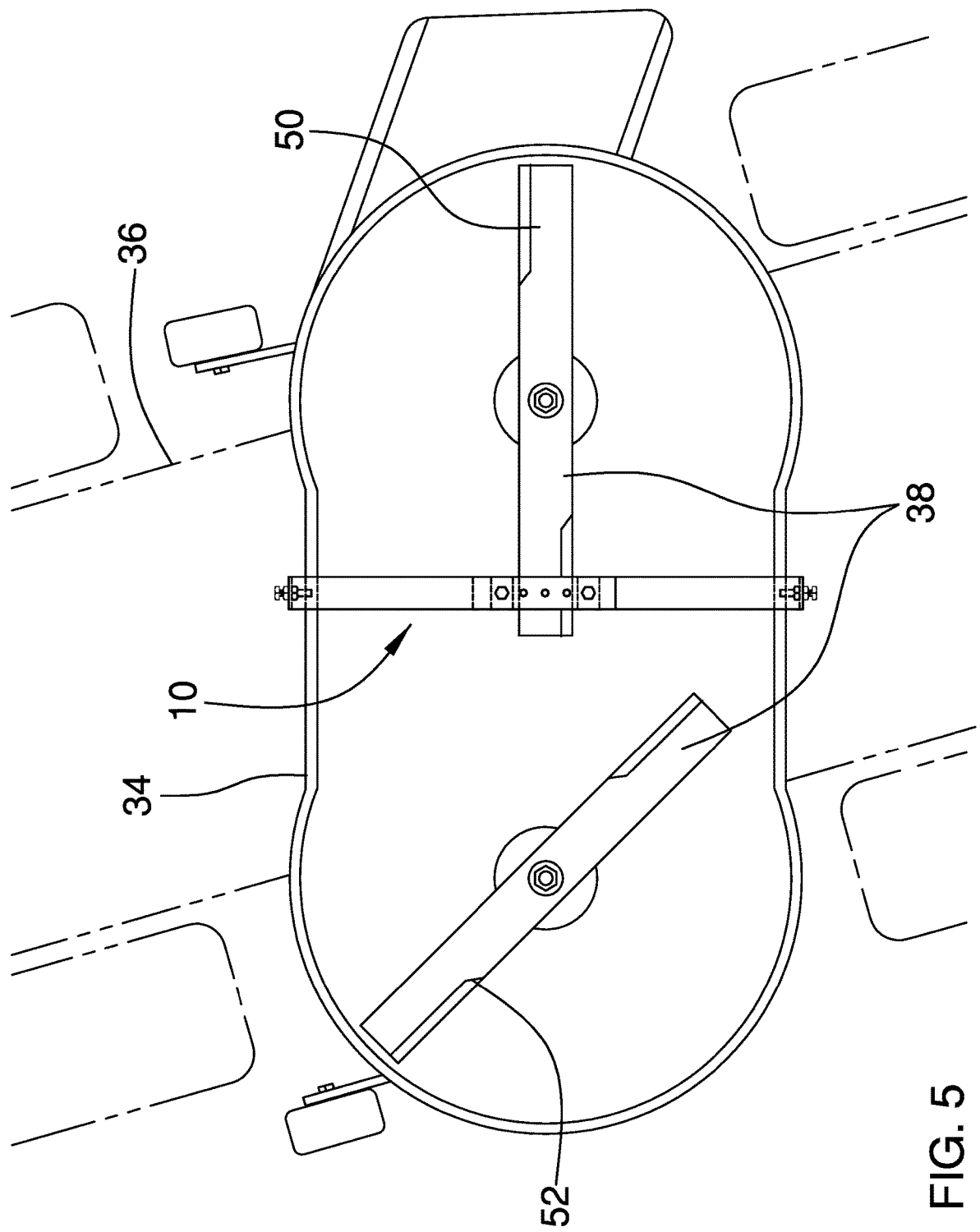
FIG. 5 is an in-use view of an embodiment of the disclosure.
Figure 6:
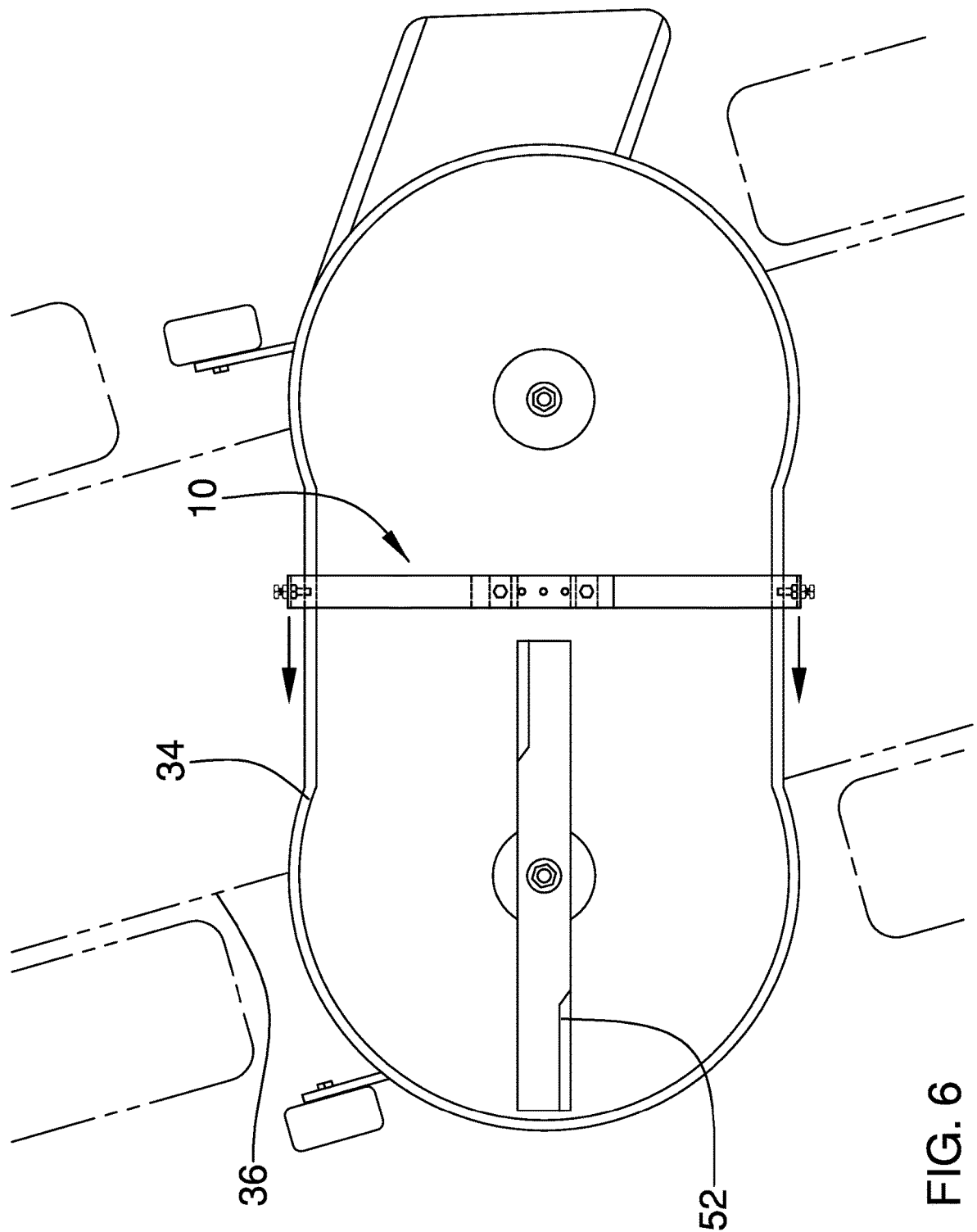
FIG. 6 is an in-use view of an embodiment of the disclosure.

In use, the adjustment apertures 24 are aligned as needed to place the first distal end 18 and the second distal end 20 on each side of the skirt 34 of the lawn mower. The assembly bolts 26 are then engaged with the adjustment apertures 24 and the assembly apertures 46 before receiving the assembly nuts 48. The receiving portion 44 is slid over the desired blade 38 and the mounting bolts 32 are engaged with skirt 34 of the lawn mower to prevent a first blade 50 of the pair of blades from moving while removed as shown in FIG. 5. The mounting bolts 32 are then loosened to slide the receiving portion 44 onto a second blade 52 of the pair of blades as shown in FIG. 6.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A mower blade bracket apparatus comprising:
   a bracket body, the bracket body comprising a first half adjustably coupled to a second half to adjust for a distance between a first distal end and a second distal end, the first distal end and the second distal end having a first mounting aperture and a second mounting aperture extending therethrough, respectively;
   a pair of mounting bolts coupled to the bracket body, the pair of mounting bolts being engaged with the first mounting aperture and the second mounting aperture and configured to selectively engage a skirt of a lawn mower;
   a blade sleeve coupled to the bracket body, the blade sleeve being configured to slidingly receive a blade of the lawn mower; and
   each of the first half and the second half of the bracket body having a plurality of adjustment apertures extending therethrough, the plurality of adjustment apertures being selectively alignable to receive a pair of assembly bolts.

2. The mower blade bracket apparatus of claim 1 further comprising the blade sleeve having a pair of assembly apertures extending therethrough, the pair of assembly apertures selectively receiving the pair of assembly bolts.

3. A mower blade bracket apparatus comprising:
   a bracket body, the bracket body comprising a first half adjustably coupled to a second half to adjust for a distance between a first distal end and a second distal end, the first distal end and the second distal end having a first mounting aperture and a second mounting aperture extending therethrough, respectively;
   a pair of mounting bolts coupled to the bracket body, the pair of mounting bolts being engaged with the first mounting aperture and the second mounting aperture and configured to selectively engage a skirt of a lawn mower;
   a blade sleeve coupled to the bracket body, the blade sleeve being configured to slidingly receive a blade of the lawn mower; and
   wherein the blade sleeve has a rectangular U-shaped receiving portion and a pair of lateral flange portions, the pair of assembly apertures extending through the pair of lateral flange portions.

4. The mower blade bracket apparatus of claim 1 further comprising the first distal end and the second distal end of the bracket body extending perpendicularly from a main portion of the bracket body.

5. The mower blade brace apparatus of claim 1 further comprising the pair of mounting bolts having a pair of mounting nuts, the pair of mounting nuts being positioned on each side of the bracket body.

6. A mower blade bracket apparatus comprising:
   a bracket body, the bracket body comprising a first half adjustably coupled to a second half to adjust for a distance between a first distal end and a second distal end, the first distal end and the second distal end of the bracket body extending perpendicularly from a main portion of the bracket body, each of the first half and the second half of the bracket body having a plurality of adjustment apertures extending therethrough, the plurality of adjustment apertures being selectively alignable to receive a pair of assembly bolts, the first distal end and the second distal end having a first mounting aperture and a second mounting aperture extending therethrough, respectively;
   a pair of mounting bolts coupled to the bracket body, the pair of mounting bolts being engaged with the first mounting aperture and the second mounting aperture and configured to selectively engage a skirt of a lawn mower, the pair of mounting bolts having a pair of mounting nuts, the pair of mounting nuts being positioned on each side of the bracket body; and
   a blade sleeve coupled to the bracket body, the blade sleeve having a rectangular U-shaped receiving portion and a pair of lateral flange portions, the blade sleeve having a pair of assembly apertures extending through the pair of lateral flange portions, the pair of assembly apertures selectively receiving the pair of assembly bolts, the receiving portion being configured to slidingly receive a blade of the lawn mower.

\* \* \* \* \*